UNITED STATES PATENT OFFICE.

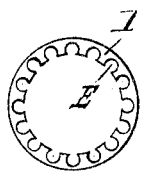
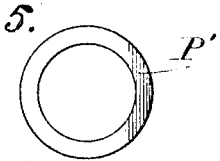
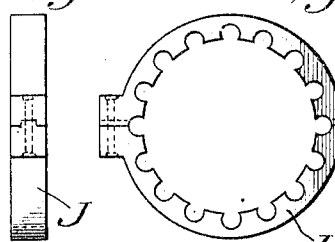
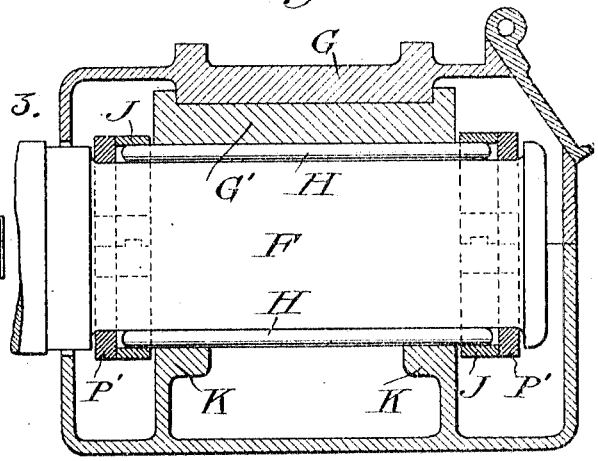
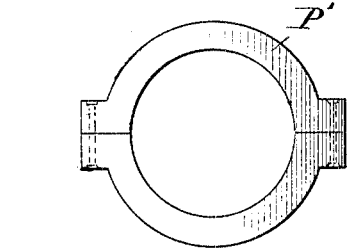
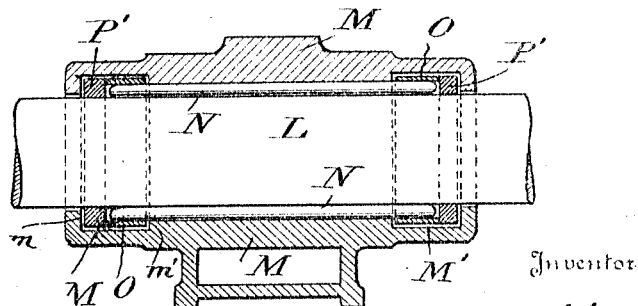

HENRY EVANS STONER, OF WALTON-ON-THAMES, ENGLAND.

ROLLER-BEARING.

1,105,935. Specification of Letters Patent. Patented Aug. 4, 1914.

Original application filed December 20, 1909, Serial No. 534,020. Divided and this application filed October 6, 1913. Serial No. 793,788.

*To all whom it may concern:*

Be it known that I, HENRY E. STONER, a citizen of the United States, residing at Walton-on-Thames, in the county of Surrey and Kingdom of England, have invented certain new and useful Improvements in Roller-Bearings; and I hereby declare that the following is a full, clear, and exact description thereof, reference being had to the accompanying drawings, which form part of this specification.

This invention relates to improvements in roller bearings such for instance as those adapted for bearings of vehicles, shafting and the like, and is a division of my application filed December 20th 1909, Serial No. 534,020.

The object of the invention is to provide improved means for separating and retaining each one of a series of rollers which are located between the axle, shaft, or spindle and the wheel box or bearing respectively and at the same time to provide means for takig the end thrust of the rollers when under side strain and so preventing wear on the fixed collars of the shaft or bearing due to the roller ends coming into contact with such collars.

The invention also provides for an unbroken or uninterrupted bearing surface for the rollers on the axle spindle or shaft as well as in the bearing, casing, or sleeve surrounding same.

The class of bearing is that in which rollers of uniform diameter and considerable length are carried at each end by grooved retaining devices which hold said rollers for some distance of their length the grooves having closed ends to enable the retainers to take the end thrusts of the rollers. Heretofore such retainers have been connected by bolts so as to form a self contained cage in which the rollers are held.

According to this invention the rollers are provided with retainers—one at each end, independent except for the rollers which they mutually hold and which retainers seat in recesses of the carrying box, hub, sleeve, or block or abut against the ends or shoulders of the actual bearing surfaces of the same so that they are by this means kept apart or located in addition to the separation they naturally obtain by the rollers, whereby the strains set up in the usual self contained bearings (where the retainers are connected by bolts) are avoided, the retainers being quite loose, and loose washers or thrust plates being provided to take up the thrusts of the rollers and to transmit same to the collars or other fixed parts of the shaft.

The retainers have the usual slots or grooves which in the present improvement are cut longitudinally through them so that they engage the ends of the plain rollers, and the end thrust of the rollers is taken up by and transmitted through loose washers or thrust plates at the outer ends of the retainers and which can be readily renewed when worn at little expense.

In the accompanying drawings:—Figure 1 is a central longitudinal section of the bearing as applied to the axle of a railway vehicle. Fig. 2 is an end elevation of one of the retainers for the same; and Fig. 2$^a$ is a view of the related thrust plate or washer therefor. Fig. 3 is a side elevation of such retainer. Fig. 4 is an end elevation of a modification of one of the retainers; and Fig. 5 is a view of the related washer or thrust plate therefor. Fig. 6 is a central longitudinal section of the bearing as applied to line shafting.

In Fig. 1, F is the axle, and G the box or sleeve of the wheel boss. H are the rollers which are separated and retained in their relative position by the retainers J, one at each end.

To take the end thrust of the rollers I provide loose washers or thrust plates P' which may be loosely fitted on the axle or adjacent the outer ends of the retainers so as to prevent undue longitudinal play of the rollers and relieve the retainers of any end thrust which might be exerted by the rollers. Said washers or thrust plates can readily be renewed when worn and are less expensive than the retainers. The retainers and washers may be made in one piece as shown in Figs. 4 and 5 or divided into two or more parts which may be secured together if desired by screws, rivets, or other suitable fastenings as shown in Figs. 2, 2$^a$ and 3 as may be most convenient in any particular application of the invention.

The top of the axle box G is fitted with a bearing block or shoe G', the inner surface of which bears upon the rollers and transmits the weight to them and when below the center the rollers are kept in close contact with the axle by keep pieces K which may form a part of the bottom of the axle box. These keep pieces also allow for lubrication of the bearing by the usual pad or other suitable means. The retainers in this instance have their inner sides or ends arranged to abut against the end or shoulders of the bearing block G', and the rollers, retainers and washers are held in their position in the bearing longitudinally by a shoulder on the axle at the inner end and by a collar or other suitable device at the outer end.

Each retainer is substantially a bush with a series of grooves E cut from the inside some distance into it in depth radially and all of its length longitudinally. The location of the grooves in the bush is such that the rollers project slightly beyond the inner surface of the retainer and bear on the axle, shaft or spindle while the retainer itself is clear of the axle, shaft, or spindle.

In Fig. 6, L is the shaft, M the bearing block, corresponding to the box or sleeve of Fig. 1; N the rollers, O the retainers, and P' the rings. In such case both the retainers and washers may be made whole or in two or more pieces suitably connected as the circumstances of the case require. Annular recesses or grooves M', M' may be formed in the interior of the bearing block M, at opposite ends thereof, adapted to receive the retainers and provide integral shoulders or abutments $m$ and $m'$ between which the retainers O and related washers P' are confined. The bearing block may be made in separable parts to permit the retainers and washers to be fitted in said recesses, such parts being bolted or otherwise secured together.

In the application of my invention illustrated in Fig. 6 of the drawings the retainers and washers are fitted in the annular recesses on the interior of the axle-bar or bearing block so as to abut the shoulders at opposite ends of said recesses, and are thereby held against axial movement.

The rollers have a free fit both in diameter and longitudinally in the grooves of the retainers and the retainers are quite free of both the axle and the sleeve or casing, in all directions, so that there is little or no friction between any of these parts. The use of two retainers insures the bearing running firmly and fairly thus keeping the rollers parallel with each other and as the ends of the rollers which project through the retainers abut against adjacent loose washers or thrust plates P' such roller ends do not come in contact with the fixed collars on the axle and any wear due to the end thrust of the rollers is taken by the said washers which can readily be renewed. The retainers and rollers are held in their position in the bearing longitudinally by the fixed shoulder of the axle at the inner end and by a nut and washer, collar, nut or other suitable fastening at the outer end. If it is desired however to prevent the rollers and retainers from falling apart when the wheel is withdrawn from the axle, means may be provided to enable the wheel sleeve rollers, thrust plates and retainers to be withdrawn from the axle together. The sleeve or casing can be made in one piece or a number of pieces as may best suit the convenience of any particular application.

The axle-box may rotate on a fixed shaft or spindle, as shown in Fig. 1, or the axle-box may be held stationary while the axle or shaft is adapted to rotate, as shown in Figs. 1 and 6; hence the term "axle" as used in the appended claims is intended to include either a fixed or rotating member.

In the claims hereinafter the term "box" must be interpreted to include any of the equivalent parts hereinbefore described and and the term "axle" to include a shaft.

What I claim is:

1. A roller bearing comprising an axle-box having on the inner side thereof at each end an annular recess with an integral shoulder or abutment at each end of the recess, a series of rollers on the interior of the axle-box, an independent retainer confined in each of said recesses at the ends of the axle-box between the said oppositely disposed abutments or shoulders at the ends of the recess, each retainer comprising a ring or annulus having a series of spaced grooves in its inner side extending some distance into it in depth radially to receive the ends of said rollers, and a loose or independently rotative thrust-plate or washer adjacent the outer end of the retainer forming an abutment for the ends of the rollers and adapted to take the end thrust thereof.

2. A roller bearing comprising an axle and an axle-box having oppositely disposed integral shoulders or abutments at each end of the box, a series of rollers of uniform diameter arranged between said axle and box, an independent retainer at each end of said axle-box, each retainer comprising a bush having a series of spaced grooves in its inner side extending some distance into it in depth radially, and an independently rotative thrust-plate or washer adjacent the outer end of each retainer forming an abutment for the ends of the rollers and being adapted to take the end thrust of the rollers, the retainers and thrust plates or washers being located outside the effective bearing surface of the rollers on the axle-box and being confined between the oppositely disposed shoulders or abutments at the ends of the axle-box.

In testimony that I claim the foregoing as my own, I affix my signature in presence of two witnesses.

HENRY EVANS STONER.

Witnesses:
R. WESTACOTT,
ALEX H. MATHER.